United States Patent [19]

Manfroni

[11] 4,378,164
[45] Mar. 29, 1983

[54] FLAVOR MIXING AND DISPENSING UNIT FOR ICE CREAM MACHINES

[75] Inventor: Ezio Manfroni, Bologna, Italy

[73] Assignee: Carpigiani Bruto Macchine Automatiche, Bologna, Italy

[21] Appl. No.: 294,005

[22] Filed: Aug. 18, 1981

Related U.S. Application Data

[63] Continuation of Ser. No. 57,382, Jul. 13, 1979, abandoned.

[30] Foreign Application Priority Data

Jul. 11, 1978 [IT] Italy .............................. 12702 A/78

[51] Int. Cl.³ .................. B01F 5/06; B01F 15/02; B01F 15/06
[52] U.S. Cl. .................................. 366/177; 222/135; 366/182; 366/194
[58] Field of Search ............... 366/148, 154, 155, 169, 366/172, 165, 173, 182, 194–196; 222/135, 226, 229, 236, 237

[56] References Cited

U.S. PATENT DOCUMENTS

| | | | |
|---|---|---|---|
| 2,032,970 | 3/1936 | Bendfelt | 426/565 |
| 2,190,226 | 2/1940 | Alexander | 426/565 |
| 2,239,165 | 4/1941 | Adams | 426/565 |
| 2,667,846 | 2/1954 | Grumbly . | |
| 2,736,534 | 2/1956 | Atkins . | |
| 2,867,418 | 1/1959 | Merrels . | |
| 3,052,381 | 9/1962 | Carpigiani . | |
| 3,149,756 | 9/1964 | Carpigiani . | |
| 3,267,971 | 8/1966 | Mueller . | |
| 3,276,633 | 10/1966 | Rahauser . | |
| 3,830,407 | 8/1974 | Wierlo . | |
| 3,934,427 | 1/1976 | Keyes . | |
| 4,152,079 | 5/1979 | Raitt | 366/196 |

FOREIGN PATENT DOCUMENTS

| | | |
|---|---|---|
| 1360757 | 4/1964 | France . |
| 2158556 | 6/1973 | France . |
| 2233577 | 1/1975 | France . |
| 803845 | 2/1968 | Italy . |
| 6709932 | 1/1975 | Netherlands . |
| 1076117 | 7/1967 | United Kingdom . |
| 1260669 | 1/1972 | United Kingdom . |

*Primary Examiner*—Philip R. Coe
*Assistant Examiner*—Timothy F. Simone
*Attorney, Agent, or Firm*—Larson and Taylor

[57] ABSTRACT

A flavor mixing and dispensing unit for ice cream machines comprising a vertical cylinder open at its top and closed at its bottom by a bottom wall; said bottom wall being provided with a central through boring and with a number of radial slits extending from said central boring toward the outer periphery of said bottom wall; at least one flavoring substance injection port opening in said cylinder at a position just above said bottom wall; an ice cream inlet port opening in said cylinder at a position above said flavoring substance injection port; a rotor arranged at the bottom of said cylinder, said rotor being provided with radial arms, and being supported by a spindle extending upwardly through the said cylinder up to the actuating shaft of a suitable motor; a piston, provided with an axial boring for the passage of said spindle, slidably housed inside of said cylinder; means for lifting and lowering said piston in said cylinder from a position in which the bottom of said piston is disposed slightly above the top face of said rotor to a position in which the bottom of said piston is disposed high enough to allow ice cream to pass through said ice cream inlet port; and duct means for connecting said flavor injection port and said ice cream inlet port to a flavor injection device and to an ice cream supply, respectively.

3 Claims, 4 Drawing Figures

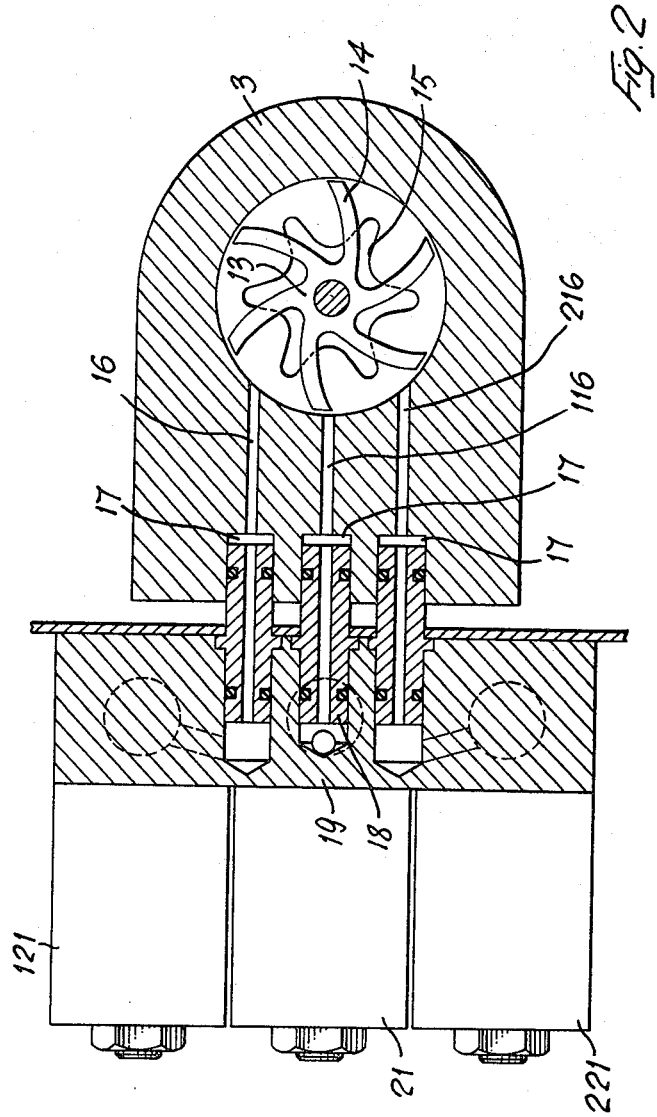

FLAVOR MIXING AND DISPENSING UNIT FOR ICE CREAM MACHINES

This is a continuation, of the application Ser. No. 57,382 filed July 13, 1979, abandoned.

BACKGROUND OF THE INVENTION

This invention relates to a flavor mixing and dispensing unit for ice cream machines, of the kind in which an ice cream of neutral taste is flavored during the dispensing operation with a syrup or the like flavoring substance.

DESCRIPTION OF THE PRIOR ART

Devices for dispensing ice cream and a flavoring syrup are known, as evidenced by the following brief description of the prior art known to the Applicant.

The Grumbly patent (U.S. Pat. No. 2,667,846) relates to a flavor injection unit for frozen dessert machines, according to which the delivery end of the freezing chamber of an ice cream making machine is connected through discharge passages to the ice cream dispensing valves. Inside of the said discharge passages means for the injection of flavoring substances in the ice cream stream are provided. By this arrangement an ice cream and syrup mixture is delivered from the ice cream dispensing valves.

The Rahauser Patent (U.S. Pat. No. 3,276,633) relates to a multiple flavour mixing machine for frozen confections according to which the ice cream and the flavoring syrup are admitted, through a piston valve, into a cylindrical mixing compartment, in which they are mixed together by means of a rotating agitator. The mixture is thereafter discharged through a delivery port disposed at the lower end of said mixing compartment.

The Carpigiani Patent (U.S. Pat. No. 3,149,756) relates to a multi-piston dosing and dispensing cock according to which dosed amounts of ice cream and flavoring syrup are admitted into concentrical cylindrical chambers, and the syrup is poured onto the dispensed ice cream, during the ice cream dispensing operation.

The APAW Patent (Italian Pat. No. 803,845) relates to an ice cream dispensing piston cock according to which all around the ice cream extrusion port a crown of syrup dispensing nozzles is provided.

The Wierlo Patent (U.S. Pat. No. 3,830,407) relates to multi-flavored milkshake dispenser, which is very similar to the device disclosed in the Rahauser Patent discussed above.

The Atkins Patent (U.S. Pat. No. 2,736,534) relates to a flavor mixing valve provided with a rotating mixer element for mixing the incoming ice cream and syrup.

All the above described prior art devices may be subdivided into two groups, namely:
- (A) Devices in which the flavoring substance is admixed intimately in the body of the dispensed ice cream (Atkins, Rahauser, Wierlo, Grumbly).
- (B) Devices in which the flavoring substance is poured on the surface of the delivered ice cream (Carpigiani, APAW).

In the first instance, an ice cream is obtained which is flavored in a uniform manner and which is colored with an uniform color throughout its mass.

In the second instance, the ice cream and the flavoring substances are kept distinct one from another, and there is the great disadvantage that the syrup has the tendency to drip along the dispensed ice cream.

SUMMARY OF THE INVENTION

It is therefore the main object of the present invention to provide an ice cream and syrup dispensing device which is capable of obviating the drawbacks of the prior art device, and which is capable of dispensing a flavored ice cream wherein the syrup is amalgamated only with selected peripheral parts of the dispensed ice cream, so as to produce a variegated ice-cream in which the syrup does not tend to drip along the ice cream because it is incorporated therein peripherally.

According to the invention, this object is obtained by providing a flavor mixing and dispensing unit for ice cream machine comprising a vertical cylinder open at its top and closed at its bottom by a bottom wall; said bottom wall being provided with a central through boring and with a number of radial slits extending from said central boring toward the outer periphery of said bottom wall; at least one flavoring substance injection port opening in said cylinder at a position just above said bottom wall; an ice cream inlet port opening in said cylinder at a position above said flavoring substance injection port; a rotor arranged at the bottom of said cylinder, said rotor being provided with radial arms, and being supported by a spindle extending upwardly through the said cylinder up to the actuating shaft of a suitable motor; a piston, provided with an axial boring for the passage of said spindle, slidably housed inside of said cylinder; means for lifting and lowering said piston in said cylinder from a position in which the bottom of said piston is disposed slightly above the top face of said rotor to a position in which the bottom of said piston is disposed above said ice cream inlet port; and duct means for connecting said flavor injection port and said ice cream inlet port to a flavor injection device and to an ice cream supply.

BRIEF DESCRIPTION OF THE DRAWINGS

These and other objects and advantages of the present invention will be best understood from the following detailed description of a preferred embodiment of the invention, made with reference to the accompanying drawings, in which:

FIG. 2 is a cross-sectional view of the device of FIG. 1, on line II—II of FIG. 1.

Figure 1:
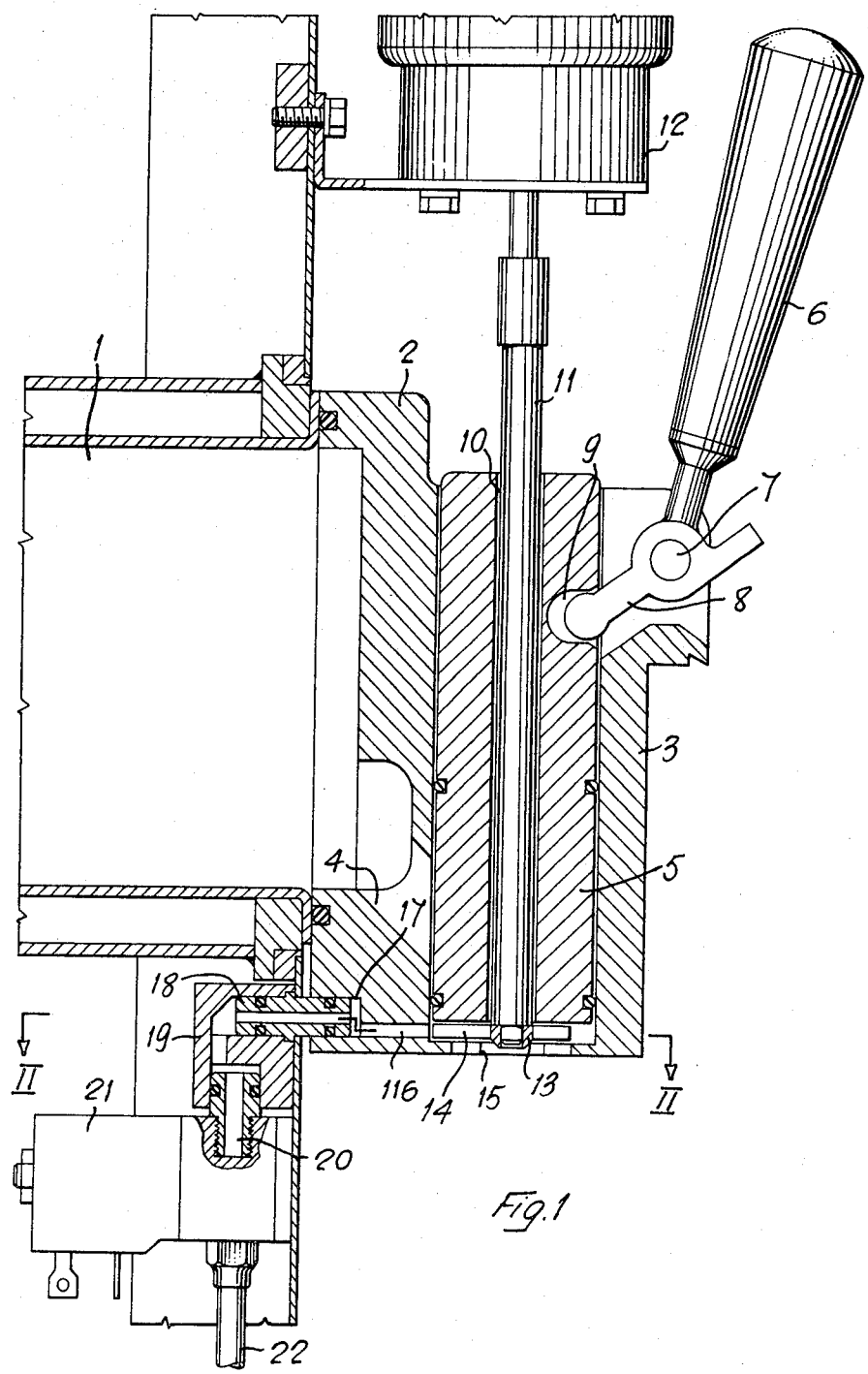
FIG. 1 is a longitudinal sectional view of a dispensing device according to the invention.

With reference to the drawings, and particularly to FIGS. 1 and 2 thereof, the numeral 1 indicates the horizontally-extending freezing cylinder of an ice-cream making machine. The end of this cylinder 1 is closed by a cover 2 having integral therewith a vertically-extending cylinder 3. The latter communicates, near its bottom end, with the freezing chamber 1 through a duct 4 in said cover 2. Slidably mounted in the cylinder 3 is a plunger 5 which is manually actuated by a lever 6 pivoted at 7 on a lug which is integral with said cylinder 3 and is provided with an extension 8 engaged within a cutout 9 in said plunger 5. The latter is provided with a through-hole 10; freely rotatable in said through-hole is a spindle 11 which is connected at its upper end with the shaft of an actuating electric motor 12, and is provided at its lower end, which projects beyond the lower end of said plunger 5, with a disc like rotor 13 provided with radial arms 14. The lower end of cylinder 3 is closed by a wall member having a central star-shaped extrusion hole 15 with six peripheral cutouts, as shown in FIG. 2. At the level of said rotor 13, the cover is provided with ducts (three in the illustrated case, see FIG. 2) 16, 116, 216 respectively, communicating at one end with the bore of said cylinder 3, and at the opposite end with a recess 17 in said cover 2. Sealingly engaged in said recess 17 is one end of a tubular connecting member 18 the opposite end of which is sealingly engaged in a recess of another connecting member 19 communicating with a duct 20 for feeding a syrup, under the control of an electrically-operated check valve 21. Syrup is fed to said valve 21 and to duct 20 through a tube 22 communicating with a pressurized reservoir (not shown) containing the syrup.

Figure 3:
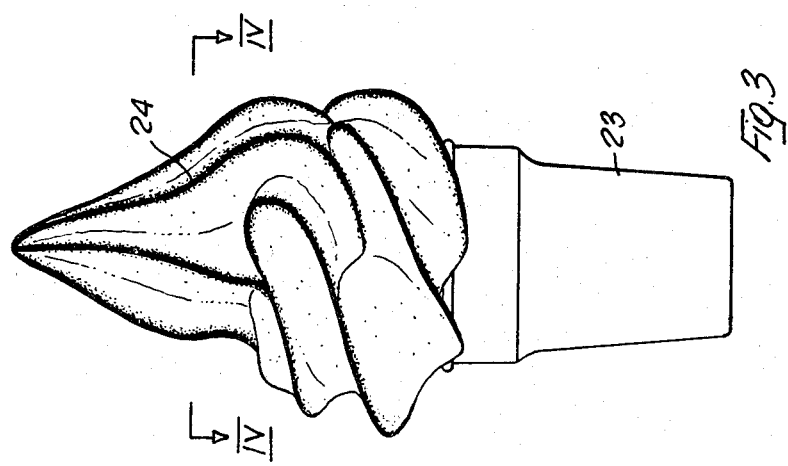
FIG. 3 shows a "variegated" ice-cream in a cone, produced by the device according to the invention.

The device hereinbefore described operates as follows:

When ice-cream is to be dispensed, the lever 6 is actuated so a to lift said plunger 5. The actuation of the lever 6 causes, through a micro-switch (not shown) the motor 12 to start and the check valve 21 to open. The plunger 5 will be lifted until it opens said duct 4, whereby ice-cream will be admitted and, then, will pass past the rotor 13, where it will be peripherally mixed with the syrup from said ducts, whereafter the so-flavoured ice-cream is extruded through said star-shaped hole 15 and is deposited into a cone 23 (FIG. 3). On completion of dispensation, that is when the lever 6 is tripped back to its original position (shown in FIG. 1), said motor 12 is de-energized and said check-valve 21 is closed again, so as to interrupt the flow of syrup.

Figure 4:
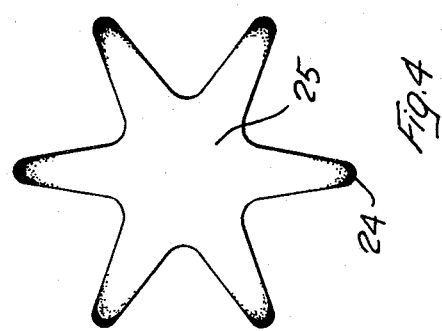
FIG. 4 is a cross-sectional view of the ice-cream of FIG. 3, substantially on line IV—IV of FIG. 3.

As shown in FIGS. 3 and 4, the dispensed ice-cream will present streaks 24 having the same colour as the used syrup, more intense at the apexes of said cutouts in the extrusion hole 15. These streaks 24 are gradually shaded towards the intermediate zone between two cutouts, thus giving the dispensed ice-cream a characteristic and pleasant appearance. Moreover, as shown in FIG. 4, the syrup penetrates deeply in the ice-cream body at the streaks 24 (darker shade in the drawing), then shades gradually at both sides of each streak, while the core of the ice-cream 25 substantially preserves its initial colour. Thus, the syrup is not simply deposited on the body of the ice-cream, which would cause undesired dripping, but is lastingly incorporated in said body where it is deposited.

As shown in FIG. 2, each dispensing valve can have associated therewith a plurality of feeding ducts for syrups of different flavours, each feeding duct being controlled by an independent electrically-operated valve (21, 121, 221); in this case, the machine is provided with a pre-selection circuit that pre-establishes the operation of the valve corresponding to the selected flavour.

The valves 21 are de-energized at the end of each dispensing operation with a little in advance with respect to the ice-cream admission in cylinder 3, so that the last amount of ice-cream delivered will eliminate any syrup from the dispenser.

Obviously, this invention is not limited to the embodiments here shown and described, but embraces all changes and modifications falling within the broadest scope of the inventive concept, as set forth in the appended claims.

I claim:

1. A flavour mixing and dispensing unit for ice cream machines comprising a vertical cylinder having a flat bottom wall, said bottom wall being provided with a central extrusion port, at least one flavouring substance injection port in said cylinder, a mixing rotor coaxially arranged at the bottom of said cylinder, an ice cream inlet port opening in said cylinder at a position above said rotor, said rotor being driven by a spindle extending upwardly through the said cylinder up to the actuating shaft of a suitable motor, a piston provided with an axial boring for the passage of said spindle and slidably housed inside of said cylinder, means for lifting and lowering said piston in said cylinder from a lower position in which the bottom of said piston is disposed slightly above the top face of said rotor to a raised position in which the bottom of said piston is disposed high enough to allow ice cream to pass through said ice cream inlet port and into the cylinder, and duct means for connecting said flavouring substance injection port to a flavour injection device, said extrusion port being star-shaped, having a central opening and radial slits, said mixing rotor being in the form of a disc having radial cutouts to define radial arms, said rotor being disposed just over the said flat bottom wall, in sliding engagement therewith, with the radial arms of the rotor positioned to pass over the radial slits of the star shaped extrusion port and said flavouring substance in injection port being disposed in the plane of said rotor and directed transversely with respect to the axial direction of said rotor, such that the flavouring substance enters the cylinder, into the plane of the disc shaped rotor, between its arms, and is carried into the ice cream and primarily through the radial slits of the star-shaped extrusion port so as to be located primarily on that portion of the ice cream which passes through the radial slits.

2. A device according to claim 1, in which the diameter of the said flavouring substance injection port is substantially the same as the thickness of the said rotor, taken in the axial direction.

3. A device according to claim 1, further comprising electrically operated valve means for controlling the flow of flavouring substance to said cylinder.

* * * * *